United States Patent
Meggiolan et al.

(10) Patent No.: US 12,403,881 B2
(45) Date of Patent: Sep. 2, 2025

(54) BICYCLE HYDRAULIC DISC BRAKING SYSTEM AND A METHOD AND SYSTEM FOR DIAGNOSING THE BRAKING SYSTEM

(71) Applicant: CAMPAGNOLO S.R.L., Vicenza (IT)

(72) Inventors: Mario Meggiolan, Creazzo (IT); Filippo Bove, Padua (IT); Stefano Rubini, Monticello Conte Otto (IT)

(73) Assignee: CAMPAGNOLO S.R.L., Vicenza (IT)

( * ) Notice: Subject to any disclaimer, the term of this patent is extended or adjusted under 35 U.S.C. 154(b) by 427 days.

(21) Appl. No.: 17/875,629

(22) Filed: Jul. 28, 2022

(65) Prior Publication Data

US 2023/0036646 A1 Feb. 2, 2023

(30) Foreign Application Priority Data

Jul. 30, 2021 (IT) .................. 102021000020564

(51) Int. Cl.
*B60T 17/22* (2006.01)
*B62J 3/14* (2020.01)
(Continued)

(52) U.S. Cl.
CPC .............. *B60T 17/22* (2013.01); *B62J 45/40* (2020.02); *B62L 3/023* (2013.01); *B62J 3/14* (2020.02); *B62J 6/24* (2020.02); *B62J 50/22* (2020.02)

(58) Field of Classification Search
CPC ...... B60T 17/22; B60T 11/165; B60T 17/225; B60T 17/221; B62J 3/023; B62J 3/14; B62J 6/24; B62J 50/22
See application file for complete search history.

(56) References Cited

U.S. PATENT DOCUMENTS 2,661,847 A * 12/1953 Collins ................ B01D 35/147
    210/136
3,179,919 A * 4/1965 Rizzuto .................. H01H 73/56
    340/623
(Continued)

FOREIGN PATENT DOCUMENTS

EP    3 835 191 A1    6/2021
JP    S59 25429 U    2/1984

OTHER PUBLICATIONS

Italian Search Report in Italian Application No. 102021000020558, May 10, 2022 with English translation.
(Continued)

*Primary Examiner* — Robert A. Siconolfi
*Assistant Examiner* — James K Hsiao
(74) *Attorney, Agent, or Firm* — Ipsilon USA—NLO

(57) ABSTRACT

A diagnostic method for a bicycle hydraulic disc braking system, having a master cylinder assembly with a cylinder inside which a piston reciprocates against the action of a return spring. The master cylinder has a hydraulic tank with a bottom, a ceiling, and a membrane that divides the hydraulic tank into two chambers. The hydraulic tank is connected to the cylinder through the bottom. A metering device measures the distance between the membrane and the ceiling of the tank. The output signal of the metering device is evaluated to determine that operation is correct when the membrane temporarily approaches the ceiling by a predetermined extent range, or incorrect otherwise. A positive evaluation reflects the correct operating condition, and a negative evaluation reflects an incorrect operating condition.

20 Claims, 7 Drawing Sheets

(51) Int. Cl.
*B62J 45/40* (2020.01)
*B62L 3/02* (2006.01)
*B62J 6/24* (2020.01)
*B62J 50/22* (2020.01)

(56) References Cited

U.S. PATENT DOCUMENTS

| | | | | |
|---|---|---|---|---|
| 3,450,853 A * | 6/1969 | Snyder | ................ | H01H 35/247 |
| | | | | 200/82 R |
| 3,541,282 A * | 11/1970 | Kretchman | ........... | B60T 17/226 |
| | | | | 200/82 D |
| 3,560,918 A * | 2/1971 | Lewis et al. | ............ | G01F 23/30 |
| | | | | 200/82 D |
| 3,577,121 A * | 5/1971 | Wing | .................... | G01F 23/185 |
| | | | | 200/82 D |
| 3,603,925 A * | 9/1971 | Hughes | .................. | H01H 36/02 |
| | | | | 340/623 |
| 3,603,926 A * | 9/1971 | Kimura | .................. | H01H 36/02 |
| | | | | 340/450.1 |
| 3,678,232 A * | 7/1972 | Hodges | .................. | G01F 23/74 |
| | | | | 340/450.1 |
| 3,691,522 A * | 9/1972 | Hocking | ............... | F16D 66/025 |
| | | | | 340/450.1 |
| 3,697,942 A | 10/1972 | Hocking et al. | | |
| 3,798,401 A * | 3/1974 | Kochanski | ............. | G01F 23/70 |
| | | | | 340/623 |
| 3,896,281 A * | 7/1975 | Feoktistov | ............. | H01H 36/02 |
| | | | | 335/207 |
| 3,922,657 A * | 11/1975 | Hayashida | ............. | G01F 23/74 |
| | | | | 340/623 |
| 3,964,079 A * | 6/1976 | Katagiri | ................ | B60T 17/225 |
| | | | | 340/614 |
| 3,985,985 A * | 10/1976 | Harwick | ................ | H01H 35/18 |
| | | | | 340/450.1 |
| 4,058,694 A * | 11/1977 | Tuegel | .................... | G01F 23/64 |
| | | | | 200/83 L |
| 4,082,930 A * | 4/1978 | Peeples | ................. | B60T 17/225 |
| | | | | 340/450.1 |
| 4,168,613 A * | 9/1979 | Nakagawa | ............... | B60T 11/22 |
| | | | | 60/592 |
| 4,583,071 A * | 4/1986 | Sebalos | ................. | F16D 66/028 |
| | | | | 188/1.11 R |
| 5,066,940 A * | 11/1991 | Schmidt | .................. | B60T 11/22 |
| | | | | 340/453 |
| 10,082,158 B2 * | 9/2018 | Ruopp | .................. | B60T 11/232 |
| 11,951,961 B2 * | 4/2024 | Ganzel | .................. | B60T 13/686 |
| 2008/0060885 A1 * | 3/2008 | Ruckh | .................... | B60T 11/22 |
| | | | | 188/26 |
| 2008/0155982 A1 * | 7/2008 | Jones | ...................... | B62L 3/023 |
| | | | | 248/309.2 |
| 2016/0177976 A1 * | 6/2016 | Ruopp | .................... | B60T 11/16 |
| | | | | 60/592 |
| 2021/0053547 A1 * | 2/2021 | Ganzel | .................... | G01F 23/74 |
| 2023/0037259 A1 | 2/2023 | Meggiolan | | |

OTHER PUBLICATIONS

Italian Search Report in Italian Application No. 102021000020564, Apr. 7, 2022 with English translation.

\* cited by examiner

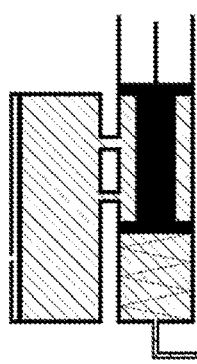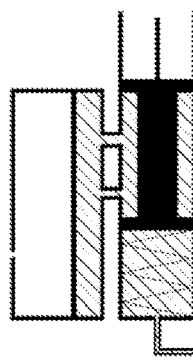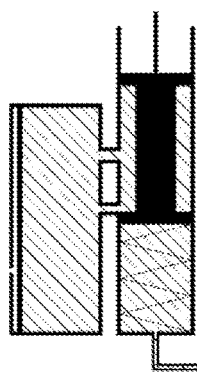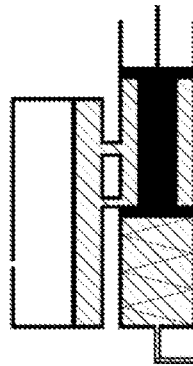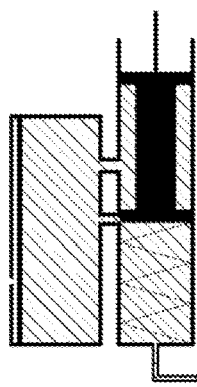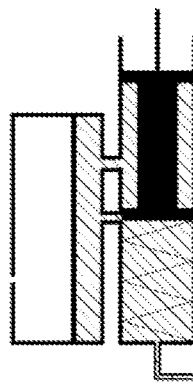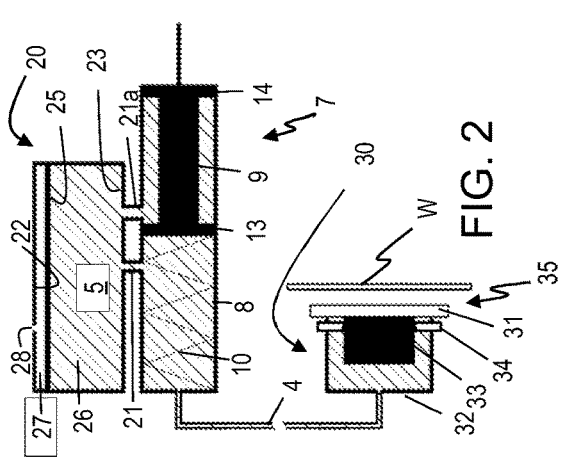

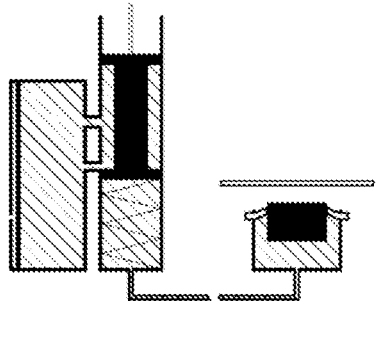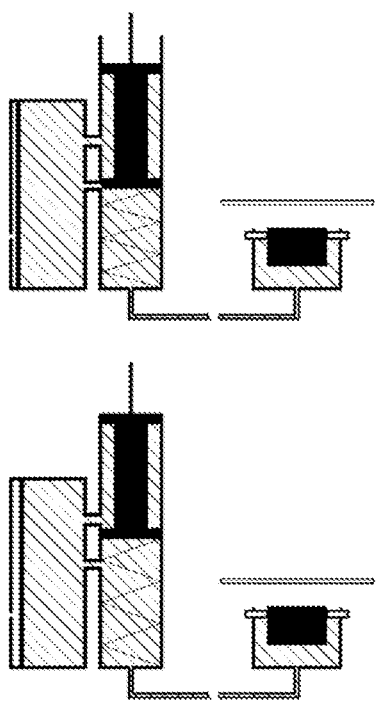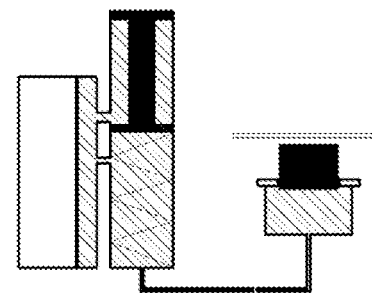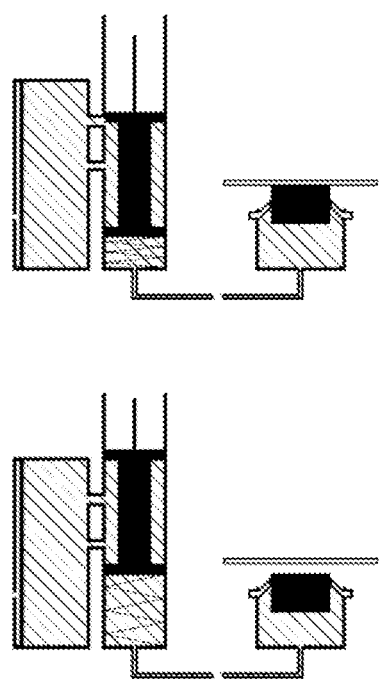

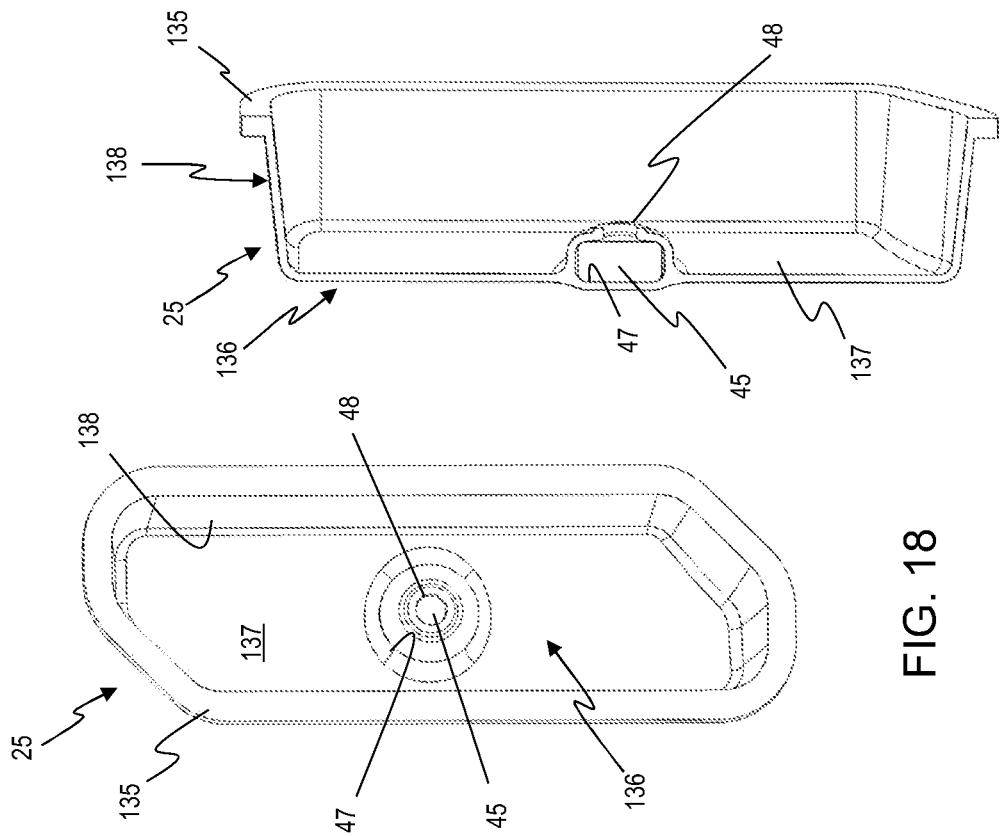
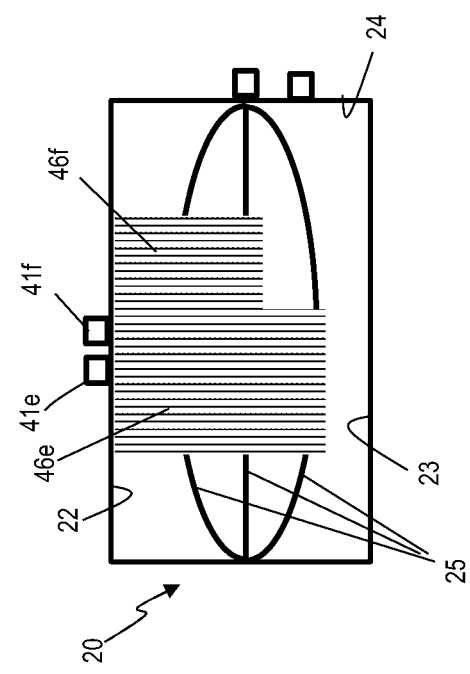

BICYCLE HYDRAULIC DISC BRAKING SYSTEM AND A METHOD AND SYSTEM FOR DIAGNOSING THE BRAKING SYSTEM

CROSS REFERENCE TO RELATED APPLICATIONS

This application claims the benefit of Italian Patent Application No. 102021000020564, filed on Jul. 30, 2021, which is incorporated herein by reference as if fully set forth.

FIELD OF INVENTION

The invention relates in general to the field of bicycle hydraulic braking systems of the disc type.

BACKGROUND

The invention relates in particular to a diagnosis system and method for a bicycle hydraulic braking system of the disc type, in particular for a master cylinder assembly thereof, as well as to a manual control device of such a system, the braking system, and a bicycle equipment comprising the system.

A bicycle braking system of the disc type generally comprises a braking device, also called brake caliper, at either or each wheel, wherein friction elements, also called pads, at least one of which is movable, are hydraulically brought into engagement with a disc integrally rotating with the hub of the bicycle wheel, in order to brake it by friction.

Bicycle disc braking systems can be of a hydraulic type.

These systems also require a hydraulic fluid, also called brake fluid, contained in a sealed circuit of the system.

In hydraulic braking systems, the hydraulic fluid circuit comprises a circuit active part and a tank in fluid communication with the circuit active part, to compensate for changes in the amount of hydraulic fluid in the active part of the circuit. Said amount changes may be due to several factors, including the operating temperature, the displacement of moving members, and the wear of the friction elements.

Typically, the tank is part of a master cylinder assembly further comprising a cylinder and a piston movable by reciprocating motion inside the cylinder against the action of a return spring, wherein the tank is fluidically connected to the cylinder through at least one main passage, which is closed or open according to the position of a head of the piston, typically provided with a gasket.

EP3835191A1 discloses a hydraulic tank for a bicycle comprising: a first wall; a second wall opposite to the first wall and configured to place the tank in liquid communication with a hydraulic cylinder; a side wall that extends between the first wall and the second wall; an elastically deformable membrane operating between the first wall and the second wall and defining inside the tank a compensation chamber having a volume variable between a maximum volume defined in a condition of maximum expansion of the compensation chamber and a minimum volume defined in a condition of minimum expansion of the compensation chamber; wherein the membrane comprises a perimeter fixing portion which is fixed to the tank, a thrusting portion configured to act on the brake liquid provided in the tank and a perimeter inlet portion inside the tank arranged between the perimeter fixing portion and the thrusting portion, wherein in the condition of minimum expansion of the compensation chamber the thrusting portion is completely arranged between the perimeter inlet portion of the membrane and the second wall of the tank.

U.S. Pat. No. 10,082,158B2 discloses a master mounting for a hydraulic actuation member which can be used for hydraulic brakes or clutch actuations, comprising, inter alia: a piston; a housing defining a compensating chamber having an interior; a cylinder having a cylinder wall, the piston being guided in the cylinder, a communication channel having an opening in the cylinder wall and connecting the cylinder and the compensating chamber in at least one position of the piston, and at least one overflow channel disposed at least at the opening of the communication channel in the cylinder wall; a gasket having an outer surface and being disposed between the piston and the cylinder; a cover; and a bellows within the compensating chamber and closed therein by the cover.

The Applicant has recognized that an incorrect mounting of the piston or of its gasket or a severe wear or breaking of the latter, as well as a clogging of said main passage due to any reason, may cause the total malfunction of the braking system, with consequent severe risk of falling of the cyclist and of road accidents.

The technical problem at the basis of the invention is to allow the diagnosis of the hydraulic system, in particular of a master cylinder assembly thereof.

SUMMARY

A diagnostic method for a bicycle hydraulic braking system, and in particular a disc brake system, having a master cylinder assembly with a piston that reciprocates against the action of a return spring. The master cylinder has a hydraulic tank with a bottom, a ceiling, and a membrane that divides the hydraulic tank into two chambers. The hydraulic tank is connected to the cylinder through the bottom. A device measures the distance between the membrane and the ceiling of the tank, and outputs a signal based on the measurement. The output signal is evaluated in a data processor to determine that operation is correct when the membrane temporarily approaches the ceiling by a predetermined extent range, or incorrect otherwise.

BRIEF DESCRIPTION OF THE DRAWINGS

Further features and advantages of the invention will be better highlighted by the description of example embodiments thereof, made with reference to the attached drawings, wherein:

FIGS. 2-15 schematically show some components of the bicycle hydraulic braking system, in different operating conditions, FIG. 16 schematically shows a hydraulic tank in different operating conditions, and associated sensors, FIG. 17 is analogous to FIG. 16, but wherein the hydraulic tank has sensors of a different type, FIGS. 18 and 19 show a membrane of the hydraulic tank, respectively in a perspective view and in a partially sectional perspective view, FIGS. 20 and 21 schematically show different faces of a printed circuit board which may be used in the bicycle hydraulic system, FIG. 22 schematically shows a different printed circuit board which may be used in the bicycle hydraulic system, FIGS. 26-27 show a braking device of a bicycle hydraulic system, respectively without a friction element and provided therewith, wherein FIG. 27 is cutaway.

DETAILED DESCRIPTION OF THE PREFERRED EMBODIMENTS

Figure 1:
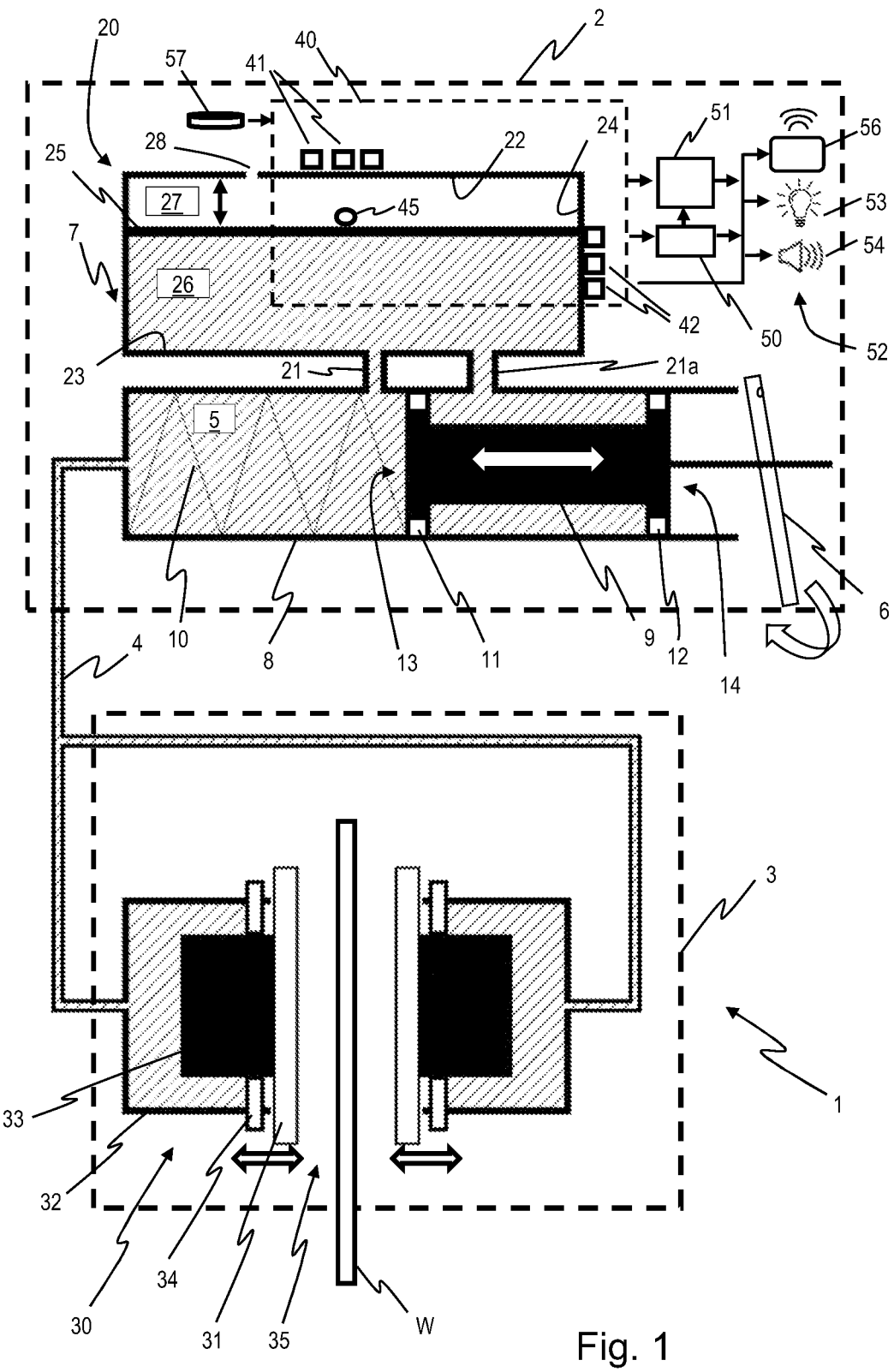
FIG. 1 schematically shows a bicycle hydraulic braking system.

In one aspect, the invention relates to a diagnosis method for a bicycle hydraulic braking system of the disc type, in particular of a master cylinder assembly thereof, the method comprising the steps of:
- a) providing a master cylinder assembly comprising a cylinder, a piston movable by reciprocating motion inside the cylinder against the action of a return spring, as well as a hydraulic tank comprising a bottom, a ceiling, and a membrane dividing the tank in a variable volume filled chamber and a complementarily variable volume empty chamber, said tank being fluidically connected to the cylinder through at least one main passage in said bottom,
- b) providing a meter device of the distance of the membrane from the ceiling of the tank,
- c) inserting a hydraulic fluid in the master cylinder assembly,
- d) moving the piston by reciprocating motion inside the cylinder,
- e) evaluating, with processing means, whether an output signal of the membrane detector device is indicative of a temporary approach of the membrane to the ceiling having an extent corresponding to a predetermined approach range,
- f) establishing that the master cylinder assembly is correctly operating if the evaluation is positive, that the master cylinder assembly is not correctly operative if the evaluation is negative.

In the present description and in the attached claims, under term "diagnosis" the examination aimed at formulating a judgment on the conditions and the operation of the various parts is meant to be indicated, including testing.

The Applicant observed that if the master cylinder assembly is correctly operating, in particular if said main passage is not clogged and there is sealing between the piston and the cylinder, in particular if a gasket possibly arranged at a head of the piston is undamaged, the thrust of the piston first forces a part of the brake fluid in the tank and only thereafter, if and when said main passage is correctly closed at crossing thereof by the piston head, possibly provided with a gasket, the brake fluid is forced in the active part of its circuit. On the other hand, if the passage is clogged the brake fluid is immediately forced in the circuit active part, without being initially forced in the tank; if there is no suitable sealing, the brake fluid is not (or not only) forced in the circuit active part and is instead (or also) forced in a larger amount in the tank.

Through the evaluation of the distance of the membrane from the ceiling, it is therefore possible to control that said behavior takes place correctly.

The master cylinder assembly may be fluidically connected in the hydraulic braking system during the execution of steps d), e), f).

In an aspect, the invention relates to a diagnosis system of a bicycle hydraulic braking system of the disc type or of a master cylinder assembly thereof, the system comprising:
- a master cylinder assembly comprising a cylinder, a piston movable by reciprocating motion inside the cylinder against the action of a return spring, as well as a hydraulic tank comprising a bottom, a ceiling, and a membrane dividing the hydraulic tank in a variable volume filled chamber and a complementarily variable volume empty chamber, said tank being fluidically connected to the cylinder through at least one main passage in said bottom, a hydraulic fluid filing at least in part the master cylinder assembly,
- a meter device of the distance of the membrane from the ceiling of the tank,
- a data processing system configured to evaluate whether an output signal of the meter device is indicative of a temporary approach of the membrane to the ceiling having an extent corresponding to a predetermined approach range, and to establish that the master cylinder assembly is correctly operating if the evaluation is positive, that the master cylinder assembly is not correctly operating if the evaluation is negative.

The tank may comprise a lateral wall extending between the ceiling and the bottom.

The temporary approach of the membrane to the ceiling may occur during at least one length of the spring compression stroke of the piston and/or of the return stroke.

The temporary approach may start and end at the crossing of the main passage by the head of the piston in the cylinder of the master cylinder assembly.

The distance meter device may comprise a sensor arranged at the ceiling of the tank and possibly a detectable member borne by the membrane.

The sensor may be an optical sensor, comprising a light source, preferably an LED, and a photodiode or phototransistor located to receive the light emitted by the light source and reflected by the membrane or by said detectable member borne by the membrane when it is in the field of view of the optical sensor.

The detectable member borne by the membrane may be an insert of more reflective material than the material forming the membrane.

The optical sensor may be located on the inner surface of the ceiling of the tank, or it may be located on its outer surface in case the ceiling is transparent.

In the membrane a pocket may be formed configured to house the detectable member borne by the membrane.

The pocket may comprise a region wherein two layers of the membrane overlap each other and a cut in one of said overlapping layers.

The membrane may have a peripheral region intended to be fixed to the tank and a deformable central region, which in general adopts a curved configuration, with variable radius of curvature.

The sensor may face a region of the membrane as central as possible, namely as far as possible from its peripheral region fixed to the tank.

The meter device may be selectively actuatable by the cyclist.

Alternatively or additionally, the membrane detector device may be only periodically actuated under the control of said data processing system.

In this case, the diagnosis system may have a stand-by mode and comprise a waking system.

The diagnosis system may comprise at least one output device of the outcome of said evaluation.

Each of said at least one output device may be selected from the group consisting of:
 at least one audible indicator,
 at least one luminous indicator, and
 a communication device.

Said at least one sensor and said at least one luminous indicator, if present, may be housed on opposite faces of one and a same printed circuit board.

The master cylinder assembly may comprise a gasket arranged at a piston head.

In an aspect, the invention relates to a control device of a bicycle hydraulic braking system of the disc type, comprising a manual actuation member configured to issue a braking command and the diagnosis system described above, wherein the piston is displaced inside the cylinder in a forward stroke in response to the actuation of the manual actuation member.

The manual actuation member is thus configured to apply, directly or indirectly, a force when subject to a predetermined manual action, and the master cylinder assembly is configured to convert the force into pressure of the hydraulic fluid in said hydraulic braking system.

In an aspect, the invention relates to a bicycle hydraulic braking system of the disc type, comprising:
 at least one control device, comprising a manual actuation member configured to issue a braking command, the master cylinder assembly and the meter device of the diagnosis system described above, wherein the piston is displaced inside the cylinder in a forward stroke in response to the actuation of the manual actuation member, and
 a respective hydraulic braking device fluidically connected to the master cylinder assembly,
 wherein the data processing system of said diagnosis system is part of a component of the hydraulic braking system, preferably is part of the control device.

In the hydraulic braking system, the control device and the braking device are fluidically connected through a conduit to form a brake fluid circuit and, in a condition of use, a brake fluid is sealed and under vacuum in the brake fluid circuit.

The braking device may comprise at least one slave cylinder assembly.

The slave cylinder assembly may comprise a cylinder, a piston movable by reciprocating motion inside the cylinder and a friction element moved by the piston.

In another aspect, the invention relates to a bicycle equipment comprising:
 a bicycle hydraulic braking system of the disc type, comprising:
 at least one control device, comprising a manual actuation member configured to issue a braking command, the master cylinder assembly and the meter device of the diagnosis system described above, wherein the piston is displaced inside the cylinder in a forward stroke in response to the actuation of the manual actuation member, and
 a respective hydraulic braking device fluidically connected to the master cylinder assembly, and
 a speed gear shifting system,
 said at least one control device comprising at least one second manual actuation member configured to issue a speed gear shifting command,
 wherein the data processing system of said diagnosis system is part of a component of the speed gear shifting system, for example it is part of gearshift assembly thereof associated with the hub of the rear wheel.

As far as the hydraulic braking system is concerned, the above considerations apply.

Said data processing system may comprise a microcontroller.

Alternatively or additionally, said data processing system may comprise electric components and/or discrete electronic components.

FIG. 1 shows, in a totally schematic manner, a bicycle hydraulic braking system 1 of the disc type according to an embodiment of the invention.

The braking system 1 shown comprises a manual control device 2 and a braking device 3 of a wheel, also called brake caliper, fluidically connected through a conduit 4 to form brake fluid circuit, as well as, in a condition of use, a hydraulic fluid 5, also called brake fluid 5, sealed and under vacuum within the brake fluid circuit. In the figures, wherever possible the brake fluid 5 is schematized by an oblique fill, in either direction.

Those skilled in the art will understand that typically the bicycle braking system comprises a pair of braking devices 3, respectively associated with the front wheel and the rear wheel of the bicycle, as well as a pair of control devices 2, one associated with the braking device 3 of the front wheel and typically mounted at the left grip of the handlebars, and the other one associated with the braking device 3 of the rear wheel and typically mounted at the right grip of the handlebars—although other mounting positions of the control devices 2 are generally possible.

The control device 2 comprises a manual actuation member 6 configured to apply, directly or indirectly, a force when subject to a predetermined manual action, and an actuator or master cylinder assembly 7, for converting the force into pressure of the brake fluid 5.

The master cylinder assembly 7 comprises a cylinder 8 and a piston 9 movable by reciprocating motion inside the cylinder 8, against the action of a return spring 10. Gaskets 11, 12 may be arranged at the head 13 and at the thrust end 14 of the piston 9, respectively. The gaskets 11, 12, only schematically shown in FIG. 1, are preferably of the so-called "lip seal ring" type.

The master cylinder assembly 7 further comprises a tank 20 fluidically connected to the cylinder 8, configured to contain a supply of brake fluid 5. The tank 20 and the cylinder 8 are typically fluidically connected through a main passage 21 and a lubrication passage 21a.

The tank comprises a "ceiling" 22 and a bottom 23.

In the description and the attached claims, under "ceiling" of the tank it is meant to indicate the wall of the tank opposed to the wall of the tank comprising the main passage, herein indicated as "bottom" of the tank. Those terms are thus defined solely with reference to the tank itself, and they should not be understood as absolute spatial references because the bottom of the tank and the ceiling of the tank do not necessarily extend in horizontal planes. Indeed, in practice they have different inclinations.

The tank 20 is represented as if it were a straight rectangular prism, further comprising a lateral wall 24, but in practice it may have a different shape.

In the present description and in the attached claims, under the expression "lateral wall" of the tank, all the region of the wall of the tank 20 extended between the ceiling 22 and the bottom 23 should be understood.

The manual actuation member 6 is typically of the lever type, as shown in a totally schematic manner. A suitable kinematics (not shown in FIG. 1, but cf. for example the kinematics 131 of FIG. 25) may be interposed between the manual actuation member 6 and the master cylinder assembly 7, in particular between the manual actuation member 6 and the piston 9.

The pull of the lever or in general the manual action on the manual actuation member 6 determines the thrust of the piston 9 of the master cylinder assembly 7 in a direction compressing the brake fluid 5 and the return spring 10. When the pull on the lever is released, or in general when the manual action on the manual actuation member 6 ceases, the return spring 10 decompresses, determining the thrust of the piston 9 in the opposed direction.

The tank 20 allows the amount of brake fluid 5 contained downstream of the head 13 of the piston 9 to change, as better discussed hereinbelow. Because the circuit of the brake fluid 5 has to remain under vacuum, a membrane 25 is provided in the tank 20, dividing the tank 20 in a variable volume filled chamber 26 and a complementarily variable volume empty chamber 27. The membrane 25 remains in contact with the free surface of the brake fluid 5.

A vent hole 28 is made in the tank 20 above the membrane 25, for example in the ceiling 22 thereof, in order to ensure that the pressure on the membrane 25 from the side of the empty chamber 27 is the atmospheric one.

In FIG. 1, as well as in FIGS. 2-15 described hereinafter, the membrane 25 is schematically represented by a straight line in different positions, but in practice the membrane 25 may be for example fixed in position within the tank 20 at a peripheral region thereof, and have a deformable central region, which in general adopts a curved configuration, having a variable radius of curvature. See, again by way of an example only, FIG. 18-19 subsequently described.

The braking device 3 comprises one or more actuators or slave cylinder assemblies 30, fluidically connected to conduit 4, and a respective friction element 31, or pad 31, mobile, through the respective slave cylinder assembly 30, into engagement and out of engagement with a disc W integrally rotating with the hub (not shown) of the bicycle wheel to which the braking device 3 is associated.

The braking device 3 shown merely by way of an example in FIG. 1 comprises a pair of slave cylinders 30 supported in a fixed mutual position, and having substantially parallel and converging compression directions, and a pair of pads 31 which can be shifted from a rest position wherein they are at a certain distance from each other, forming a space or gap 35 wherein the disc W is free to rotate, and a close position wherein they are in contact with and thrusting on the disc W in order to brake it by friction. However, on either side of the disc W, the friction element 31 or pad might be fixed.

The or each slave cylinder assembly comprises a cylinder 32 and a piston 33 movable by reciprocating motion inside the cylinder 32 for a stroke, variable as better discussed hereinbelow. A gasket 34, typically with square cross-section ("quad ring" or Q-ring"), is interposed between the piston 33 and the cylinder 32.

When the braking system 1 is undamaged, the amount of brake fluid 5 is correct and rather it is, as an assumption, at the maximum allowed, and the pads 31 are undamaged, the operation of the braking system 1, neglecting for the time being the wear of the pads, is the following, described with reference to FIGS. 2-5, wherein for the sake of simplicity some elements of the braking system 1 are omitted. For the sake of brevity, the reference numbers are not indicated in FIGS. 3-5, and not even in FIGS. 6-15.

In a rest or non-braking condition (FIG. 2), in the control device 2 and in particular in the master cylinder assembly 7, the piston 9 is completely rearward in the cylinder 8 and its head 13—which as said may be provided with the annular sealing gasket 11 (cfr. FIG. 1) against the wall of the cylinder 8—, is positioned between the lubrication passage 21*a* and the main communication passage 21 between the cylinder 8 and the tank 20. The return spring 10 is only slightly biased to ensure the complete return of the piston 9, the tank 20 is almost full. The brake fluid 5 in the tank 20 is at a high level, at the maximum allowed under the above assumption, and the membrane 25 is in close proximity to the ceiling 22 of the tank 20. The brake fluid 5 also forms a veil (exaggerated in the Figures) about the piston 9 in order to provide a suitable lubrication.

In the braking device 3 or in the brake caliper, the piston 33 is completely rearward and the pad 31 is out of engagement with the disc W. The gap 35 is completely open, at the maximum allowed extent in the above-mentioned condition of undamaged pads 31. The gasket 34 (exaggeratedly shown in FIGS. 2-15 for the sake of clarity) is not stressed.

When in the control device 2 the piston 9 starts being thrusted in the compression direction, and as long as its head 13 remains positioned between the lubrication passage 21*a* and the main passage 21, the compression spring 10 is partially compressed, the brake fluid 5 is forced in the tank 20 through the main passage 21, and the fluid level in the tank 20 rises until essentially completely filling it.

When, as represented in FIG. 3, in the control device 2 the head 13 of the piston 9 arrives at the main passage 21 thus closing it, the fluid level in the tank 20 is maximum; the membrane 25 is shown at the "ceiling" 22 of the tank 20, the filled chamber 26 has a maximum volume substantially corresponding to that of the tank 20, and the empty chamber 27 has a substantially null minimum volume. In practice, if held at its peripheral region, the membrane 25 (or at least a central region thereof) has a configuration of maximum curvature, with the concavity facing the main passage 21. In the braking device 3 no changes occur.

In the braking device 3 no changes have occurred yet.

It has to be emphasized that the temporary displacement of the level of the brake fluid 5 in the tank 20 and of the membrane 25 has been intentionally exaggerated in FIGS. 2 and 3 in order to make it evident, but in practice the level increase of liquid 5 during the initial phase of the stroke of the piston 9, before its head 13 arrives at the main passage 21, may also be very small with respect to the total volume of the tank 20.

As the compression stroke of the piston 9 against the force of the return spring 10 continues, because the main passage 21 is closed, the fluid level in the tank 20 remains unchanged (neglecting possible level adjustment due to the lubrication passage 21*a*) at its raised level, and the brake fluid 5 is thrusted into the conduit 4, further filling the or each cylinder 32 of the slave cylinder assembly 30, and thrusting the piston 33 in the braking device 3 toward the disc W; the gasket 34 starts deforming. FIG. 4 represents an arbitrary position of the piston 33 in this condition.

In the condition of maximum actuation of the manual actuation member 6, shown in FIG. 5, the fluid level in the tank 20 is still at its raised level, equal to the maximum allowed under the above assumption, and the return spring 10 is relatively compressed. In the braking device 3, the piston 33 is extended by such a total stroke as to bring the pad 31 in contact with and thrusting against the disc W, thus causing the braking of the bicycle wheel. The elastic deformation of the gasket 34 from its rest state is maximum, corresponding to a predetermined stroke of the piston 33.

With reference to the same FIGS. 2-5 in the reverse order, upon release of the manual actuation member 6, in the braking device 3, the gasket 34 progressively recovers the elastic deformation suffered (recovery also called "roll back"), returning to its initial condition, what corresponds to said predetermined stroke of the piston 33. The cylinder 32 is progressively emptied and the piston 33 and the pad 31 are returned to the rearward position, of non-contact with the disc W, thus setting the rotation of the bicycle wheel free.

The return action of the return spring 10 in the control device 2 entails the return of the brake fluid 5 from the braking device 3 back in the cylinder 8 of the master cylinder assembly 7 and, after the head 13 of the piston 9 reaches the main passage 21, the return of the brake fluid 5 from the tank 20 to the cylinder 8, with a small emptying of the tank 20 itself. The membrane 25 returns to the initial position and the pressures between tank 20 and cylinder 32 of the braking device 3 are re-balanced.

The lubrication passage 21a allows passage of a small amount of brake fluid 5 between the cylinder 8 of the master cylinder assembly 7 and the tank 20 in order to lubricate the piston 9 and the inner wall of the cylinder 8.

The approach of the membrane 25 to the ceiling 22 is thus temporary and occurs during (at least) a length of the stroke of the piston 9 compressing spring 10 and/or of its return stroke. In particular, the temporary approach starts and ends at the crossing of the main passage 21 by the head 13 of the piston 9 in the cylinder 8 of the master cylinder assembly 7.

As the pads 31 wear out, namely as the friction material (lining or "compound") wears out due to the friction generated during braking, still assuming that the braking system 1 is undamaged and the amount of brake fluid 5 is correct, at the maximum allowed under the above assumption, the operation of the braking system 1 is the same, however an increasing compression stroke of the piston 33 of the slave cylinder assembly 30 is necessary for the pad or friction element 31 to arrive in contact with and thrusting on the disc W. The gasket 34 indeed allows, in its deformed condition, sliding of the piston 33 in the compression direction toward the disc W, while it does not allow sliding of the piston 33 in the opposed direction. In other words, as the pads 31 wear out, during the compression stroke of the piston 33 beyond the elastic deformation of the gasket 34, also sliding of the piston 33 occurs, while during the decompression stroke, only recovery of the elastic deformation of the gasket 34 ("roll-back") occurs. In the cylinder 32 of the slave cylinder assembly 30 therefore an increasing amount of brake fluid 5 has to be pumped as the pads 31 wear out, and, the stroke of the piston 9 of the main assembly 7 being equal, the tank 20 empties little by little.

FIGS. 6-9 schematically show the positions corresponding to those of FIGS. 2-5, for heavily worn out pads. It may be noted that the stroke of the piston 33 during a braking has the same extent both with new pads 31 and with worn out pads 31, and is dictated by the maximum elastic deformation of the gasket 34 and by its recovery or "roll back". However, when the pads 31 are worn out, the piston 33 protrudes more (also in the rest position) from the cylinder 32 with respect to when the pads 31 are new, by an extent corresponding to the wear of the respective pad 31. In the cylinder 32 of the slave cylinder assembly 30 there is a correspondingly larger amount of brake fluid 5, and in the tank 20 of the master cylinder assembly 7 there is a comparatively smaller amount of brake fluid 5.

With reference to FIG. 6, which represents the rest condition or condition of no braking, it is seen that the membrane 25 is in close proximity to the bottom 23 of the tank 20, the filled chamber 26 has a comparatively small volume, that becomes minimum and substantially null when the pads 31 are completely worn out, and the empty chamber 27 has a comparatively large volume, that becomes maximum and substantially equal to that of the tank 20 when the pads 31 are completely worn out. In practice, when the pads 31 are completely worn out, the membrane 25—if held at its peripheral region—has a configuration of maximum curvature in the direction opposed to that mentioned above with reference to FIG. 3, namely with the convexity facing toward the main passage 21. The membrane 25 is at a larger distance from the ceiling 22 of the tank 20 with respect to when the pads 31 are not worn out.

The sliding behavior of the piston 33 of the slave cylinder assembly 30 when the gasket 34 is in condition of maximum deformation, and of the consequent emptying of the tank 20, may be better understood with reference to FIGS. 10-15 wherein the phenomenon is even more manifest, in that they represent the first braking after a sudden detachment of the pad 31 (or of its compound), what may be considered tantamount to a sudden, heavy wear thereof. FIGS. 10-13 schematically show the positions corresponding to those of FIGS. 2-5, for new pads; in FIG. 13 in particular the gasket 34 is at maximum deformation. However, because there is no contact with the disc W, the piston 33 of the slave cylinder assembly 30 continues to advance, and the piston 9 of the master cylinder assembly 7 in the control device 2 continues to advance, further compressing the spring 10, until when, in the condition shown in FIG. 14, the piston 33 of the slave cylinder assembly 30 enters into contact with the disc W, and the spring 10 is in the condition of maximum compression. When the manual actuation member 6 is released, the piston 33 moves backward only during the above-mentioned roll-back, the gasket 34 straightens up, the spring thrusts the piston 9 of the master cylinder assembly 7 to end of stroke. An additional amount of brake fluid 5 is drawn from the tank 20, equal to the volume of the slidingly displacement of the piston 33 of the slave cylinder assembly 30. Thus, the level in the tank 20 does not return to the initial level of FIG. 10, rather it lowers further, as shown in FIG. 15 which represents the final condition after the braking. The distance of the membrane 25 from the ceiling is great, similar to the case of heavily worn out pad 31. The overall displacement of the membrane between the position of FIG. 11 and the position of FIG. 15 is large and comparatively quick with respect to the case of normal wear of the pads 31.

Turning back to FIG. 1, the control device 2 of the braking system 1 has a membrane detector device 40, configured to detect the presence of the membrane 25 in at least one predetermined position in the tank 20 and/or the distance of the membrane 25 from the ceiling 22 of the tank 20. The device 40 may therefore, in some embodiments thereof, also be called meter device 40 of the distance of the membrane 25 from the ceiling 22 of the tank 20.

Based on the above observations and as better explained hereinbelow, the Applicant believes that not only the position of the membrane 25 inside of the tank 20, and in particular its distance from the ceiling 22, are indicative of the volume of the filled chamber 26 (or of the relative volume between filled chamber 26 and empty chamber 27) and therefore of the amount of brake fluid 5 contained in the tank 20 as well as of the presence and wear of the pads 31 and in general of the integrity of the hydraulic plant 1 (no leakage of brake fluid 5), but also that its displacements over time are an indication of the correct assembly thereof, in particular of the correct assembly and therefore of the correct operativeness of the master cylinder assembly 7, in particular of the fact that the main passage 21 is not clogged and the gasket 11 of the head 13 of the piston 9, if present, is undamaged and correctly positioned.

In the latter respect, the Applicant has observed that a clogging of the main passage 21 entails the lack of temporary raising of the level of the brake fluid 5 in the tank 20 (cf. FIG. 2-3 or 6-7, for example) and the lack of temporary approach of the membrane 25 to the ceiling 22 when the head 13 of the piston 9 is at the main passage 21. The temporary displacement of the membrane 25 is therefore null or in any case less than a predetermined threshold.

If, on the contrary, the gasket 11 is not undamaged or is not correctly positioned, or in general if there is not a sufficient sealing between the head 13 of the piston 9 and the cylinder 8, then at the main passage 21 a leakage of brake fluid 5 may occur. Therefore, the thrust of the piston 9 through the manual actuation member 6 entails the thrust of further brake fluid 5 into the tank 20. The level of brake fluid 5 in the tank 20 therefore raises more than in conditions of correct operativeness of the master cylinder assembly 7. The displacement of the membrane 25, in particular its approach to the ceiling 22 of the tank 20, is therefore larger than a predetermined threshold.

Overall, in the case of a correct operativeness of the master cylinder assembly 7, the temporary approach of the membrane 25 to the ceiling 22 of the tank remains within a predetermined range of approaches; differently in the case of incorrect operativeness.

The membrane detector device 40 may thus embody a transducer device of the volume of the filled chamber 26 and/or a transducer device of the volume of brake fluid 5 present in the hydraulic braking system 1.

Through the membrane detector device 40, an evaluation device of the wear and/or of the presence of a friction element/s or pad 31 of the hydraulic braking system 1, and/or an evaluation device of the correct sealing of hydraulic fluid of the hydraulic braking system 1, and/or an evaluation device of the correct operativeness of the master cylinder assembly 7 may be embodied.

The membrane detector device 40 may comprise one or more sensors 41 arranged at the ceiling 22 of the tank 20 and/or one or more sensors 42 arranged at the lateral wall 24 of the tank 20, if present, as well as possibly one or more detectable members 45 borne by the membrane 25.

The detectable members 45, if present, are configured to interact with one or more of the sensors 41, 42 of the membrane detector device 40.

When for example the or each sensor 41, 42 is—or embodies with the detectable element(s) 45 borne by the membrane—a proximity sensor, it detects the presence or respectively the absence of the membrane 25 in its "field of view", and therefore in a predetermined position in the tank 20.

It is possible to define membrane threshold position 25, corresponding to a predetermined level, for example a minimum tolerable level, of brake fluid 5 inside the tank 20, and to provide a single proximity sensor which field of view 46 comprises said membrane threshold position 25, or a region thereof. During emptying of the tank 20 for example because of the wear of the pads 31, of a leak of the circuit of the brake fluid 5 or for the fall of a pad 31, the membrane 25 crosses said threshold position triggering the proximity sensor 41, 42, 43.

By providing for example a plurality of proximity sensors having different fields of view (or, in general, of sensors of presence of the membrane in respective predetermined positions), depicted merely by way of an example by the sensors 41a, 41b; 42c, 42d, with the respective fields of view 46a, 46b, 46c, 46d in FIG. 16, it is possible to set different threshold positions, and thus to detect different threshold amounts of brake fluid 5 in the tank 20.

It is also possible, if the number of proximity sensors is sufficient and if the respective fields of view are substantially contiguous and/or overlapping, to embody a more or less precise distance meter 40 and thus obtain a quantitative indication of the amount of brake fluid 5 present in the tank 20, according to how many and/or which proximity sensor(s) detect(s) the membrane 25 at any given time.

Alternatively, the or each sensor 41, 42 may be itself—or embody with the detectable element(s) 45 borne by the membrane—a distance meter, configured to measure the distance between the ceiling 22 of the tank 20 and the membrane 25.

In order to detect the presence in a predetermined position (threshold position) or to measure the distance, it is preferred for the or each proximity sensor 41 to be arranged, preferably on the ceiling 22 of the tank 20 (sensor 41), facing an as central as possible region of the membrane 25, namely as far as possible from its peripheral region fixed to the tank 20, because in such a central region there is the maximum relative displacement of the membrane 25 as the volume of the filled chamber 26, respectively of the empty chamber 27, changes. However, also a placement on the lateral wall 24 (sensor 42) may be effective.

From a constructive point of view, a suitable proximity sensor 41 may be a magnetic sensor, cooperating with a magnet as a detectable member 45 fixed to and mobile with the membrane 25. A suitable magnetic sensor is a Reed sensor. In use, until the magnet 45 is close to the magnetic Reed sensor, the latter is for example an open switch; when the magnet 45 is far enough from the magnetic Reed sensor, the latter is no longer affected by the magnetic field and switches state, for example closes. The field of view of the proximity sensor 41 is therefore typically a range of positions including a null distance from the Reed sensor (cf. the fields of view 46e, 46f associated with the sensors 41e, 41f exemplified in FIG. 17). However, the field of view of the Reed sensor, and therefore the minimum distance below which the magnet is detected, depends on its sensitivity. By providing, on the ceiling 22 of the tank 20, a plurality of Reed sensors 41 having different sensitivity, it is thus possible to implement different threshold positions of the membrane 25: as long as the magnet 45 is detected by all of the sensors 41, the distance of the membrane 25 is considered to be above the safety threshold, indicative of a sufficiently full tank 20; when the Reed sensor having the lowest sensitivity does not detect the magnet 45 anymore, the distance of the membrane 25 is considered to be below a first threshold (tank 20 in condition of "reserve"); and when not even the Reed sensor having the greatest sensitivity detects the magnet 41 anymore, the distance of the membrane 25 is considered to be below the minimum safety threshold (too empty tank 20). If the sensors are more than two, intermediate positions of the membrane 25 may be detected. The operation might be the reverse in case of Reed sensors that are open or closed in a dual manner with respect to what has been described.

Adjustment of the sensitivity of a Reed sensor may also be provided for, by mounting it through a precision screw support, as better described hereinbelow with reference to FIG. 22. In this manner, the final user or an installer of the bicycle braking system 1 is allowed to choose the or each level threshold, corresponding for example to a desired wear degree of the pads.

In case of leakage of brake fluid or of a fall of the pads 31, the level in the tank may quickly change, the membrane 25 being for example first detected by all of the Reed sensors, and immediately thereafter only by the one having the greatest sensitivity.

Alternatively to a Reed sensor, another type of magnetic sensor may also be used, capable of detecting a movement or a position of a magnet. For example, a Hall sensor may be used, in particular a 3D Hall sensor, or a magneto resistive sensor, such as for example an AMR ("Anisotropic magneto resistive") sensor, a GMR ("Giant magneto resistive") sensor or a TMR ("Tunnel magneto resistive") sensor. All the above-mentioned sensors detect magnetic fields and output signals relating to the position, angle, force and/or direction of the detected magnetic field, thus also allowing the meter device 40 to be configured; in the case of the 3D sensors, the movement in space of a magnetic field may be detected. Furthermore, advantageously these sensors are capable of performing high-precision measurements of the magnetic field still having an extremely compact footprint and low energy consumption.

Instead of a magnet 45, magnetized rubber may be used for the membrane 25.

With reference to FIGS. 18-19, preferably in the case of use of a magnetic sensor, in the membrane 25—which shape is merely by way of an example—a pocket 47 is formed, comprising two overlapping layers and a cut 48, for example straight or circular, in one of the layers, preferably in that on the side of the empty chamber 27 of the tank 20. The pocket 47 may be made for example by providing a "mushroom-like" protrusion in a mold of the membrane 25.

The magnet 45 is forced in the pocket 47 through the cut 48, and, thanks to the elasticity of the membrane 25, the latter closes onto the magnet 45, keeping it in the pocket 47. According to the mutual thickness of the overlapping layers, it is possible to make the magnet 45 protrude more or less on either side of the membrane 25 and thus to cause its volume to be detracted from the volume of the filled chamber 26 (as in the exemplifying case of FIG. 19) or from the volume of the empty chamber 27. Alternatively, the magnet 45 may be glued or otherwise fixed to the membrane 25, on either side.

A suitable proximity sensor 41 42 may also be an optical sensor. An optical sensor comprises in general a light source, preferably an LED, and a photodiode or phototransistor located to receive the light emitted by the light source and reflected by the membrane 25 (or by a detectable member 45 borne by the membrane) when it is in the field of view of the optical sensor.

The characteristics of the optical sensor and/or of a polarizing circuit thereof may be chosen so that the intensity of the light reflected by the membrane 25 and received by the photodiode or phototransistor, and thus the response of the optical sensor, changes as the position of the membrane 25 within the field of view, which may have an extent even comparable to a maximum size of the tank 20, Changes.

Also a single optical sensor may thus configure a distance meter 40.

In case of use of an optical sensor, it may be appropriate to provide for a reflective insert, or in any case made of more reflecting material than the material forming the membrane 25, as a detectable member 45 on the membrane 25. Such a (comparatively) reflective insert may be glued on the membrane 25 or be inserted in a pocket 47 analogously to what has been disclosed with reference to the magnet.

Alternatively, a colored membrane may be used. In the cases of an infrared optical sensor, a red membrane has turned out to be preferable.

It should be noted that the response of the optical sensor may also depend on other characteristics of the membrane 25, such as the material, the color, the local curvature, but all these factors may be suitably taken into account, possibly providing for a suitable processing of the output signal of the optical sensor.

The optical sensor may be located on the inner surface of the ceiling 22 of the tank 20, or on its outer surface in case the ceiling 22 is transparent.

A plurality of sensors of a different type may be provided for. For example, a distance meter having a field of view corresponding to a large distance range from the ceiling 22 of the tank and a proximity sensor having a field of view corresponding to a short distance range may be provided for, or vice versa.

Summing up, the membrane detector device 40 may provide a two-level output, corresponding to an amount of brake fluid 5 in the tank 20 larger or smaller than a predetermined threshold, an output having a number of discrete levels, corresponding to an amount of brake fluid 5 smaller than a given number of predetermined thresholds, or an output, having several discrete levels or analogue, indicative of the amount of brake fluid 5 present in the tank 20.

Furthermore, the membrane detector device 40 may provide an instantaneous output and/or an output processed based on two or more detections over time.

As explained above, if the amount of brake fluid 5 in the braking system 1 is not sufficient, for example because the hydraulic braking system 1 is not undamaged, then the level of brake fluid 5 in the tank 20 never rises to the maximum foreseen level—corresponding as explained above to the instant when the head 13 of the piston 9 is at the main passage 21—, namely the filled chamber 26 is never at the maximum foreseen volume, or the membrane 25 is never at the minimum, substantially null distance from the ceiling 22 of the tank 20. In case of leakage of brake fluid 5, the volume of the filled chamber 26 decreases—more or less quickly according to the extent of the leakage—even down to zero, and the membrane 25 reaches the bottom 23 of the tank 20, namely the maximum distance from the ceiling 22 of the tank 20. In case of leakage at the head 13 of the piston 9, for example in case of damage or incorrect positioning of the gasket 11, the membrane 25 moves closer the ceiling 22 than in case of correct operativeness of the master cylinder assembly 7. In case of clogging of the main passage 21, the membrane 25 does not temporarily move close to the ceiling 22 during the length of the stroke of the piston 9 after the head 13 of the piston 8 passes by the main passage 21.

The output signal of the membrane detector device 40 and/or its change over time and/or its rate of change may advantageously be used for the diagnosis of the braking system 1 and in particular of its master cylinder assembly 7, upon leaving the factory (as quality control) or after replacement of the pads 31 or after a bleeding operation, possibly temporarily replacing the pads 31 with a spacer of the pistons 33 of the braking device 3, as well as during the use of the hydraulic system 1 in order to check for intervened leaks and/or the wear of the pads 31 and/or their accidental fall and/or the other possible drawbacks mentioned above.

The membrane detector device 40 may also comprise or be associated with memory means 50, embodied by discrete components, for one or more historical detected values.

The membrane detector device 40 may also comprise or be associated with a data processing system 51 for processing its instantaneous and/or historical output.

The data processing system may comprise electric components and/or discrete electronic components and/or a micro-controller, which may also embody the memory means 50.

The processing may comprise, for example, the evaluation of a current detected value and/or the comparison of at least one historical detected value with at least one current detected value and/or the computation of a rate of change of the detected value.

The data processing system may be configured to:
- evaluate a volume of the filled chamber 26 based on said at least one output of the membrane detector device 40 and output at least one signal when the evaluated volume of the filled chamber 26 is less than at least one volume threshold, and/or
- evaluate a displacement speed of the membrane 25 based on said at least one output of the membrane detector device 40 in at least two successive time instants and issue a signal when the displacement speed is higher than a maximum speed threshold and/or
- evaluate the position of the membrane 25 in the tank 20 based on the output of the membrane detector device 40 and/or
- evaluate a displacement amplitude of the membrane based on said at least one output of the membrane detector device in at least two successive time instants and/or
- evaluate the wear and/or the presence of at least one friction element 31 of the hydraulic braking device 3 based on said at least one output of the membrane detector device 40 and/or
- evaluate the correct sealing of the hydraulic fluid 5 in the brake fluid circuit of the hydraulic braking system 1 based on said at least one output of the membrane detector device 40, for example based on the position of the membrane 25 in the tank 20 and/or of its displacement speed over time.

Evaluating the wear may comprise for example establishing that the wear is higher than a predetermined wear threshold when the distance of the membrane 25 from the ceiling 22 of the tank 20 is larger than a predetermined maximum distance threshold and/or may further comprise establishing that the wear is greater than a predetermined alert wear threshold when the distance of the membrane 25 from the ceiling 22 of the tank 20 is less than the predetermined maximum distance threshold and greater than a predetermined alert distance threshold.

Evaluating the correct sealing of the hydraulic fluid may comprise for example verifying that the displacement speed over time of the membrane 25 from the ceiling 22 of the tank 20 is less than a predetermined speed threshold.

Alternatively or additionally, the data processing system 51 may be configured to:
- evaluate whether an output signal of the meter device 40 of the distance of the membrane 25 from the ceiling 22 of the tank 20 is indicative of a temporary approach of the membrane 25 to the ceiling 22, in particular having an extent corresponding to a predetermined approach range, and
- determine that the master cylinder assembly 7 is correctly operating if the evaluation is positive, that the master cylinder assembly 7 is not correctly operating if the evaluation is negative.

In this manner the data processing system 51 embodies a diagnosis of the bicycle hydraulic braking system 1 of the disc type, in particular of its master cylinder assembly 7, wherein under term "diagnosis", the examination aimed at formulating a judgment on the conditions and the operation of the various parts is meant to be indicated, including testing.

The data processing system 51 may be part of the control device 2 as shown, or may be part of a different component of the hydraulic braking system 1.

The control device 2 may also be part of a bicycle equipment comprising, besides the hydraulic braking system, also a speed gear shifting system (not shown). In that case, the control device 2 may also comprise at least one second manual actuation member configured to issue a gear ratio change command (cf. for example the gearshift levers 70, 71 in FIG. 23 subsequently described). In that case, the data processing system 51 may be part of a component of the speed gear shifting system, for example may be part of a gearshift assembly thereof, associated with the hub of the rear wheel.

The membrane detector device 40 may also comprise or be associated with one or more output devices 52.

For example, the data processing system 51 may be configured to issue an alarm signal when the wear of the friction element 31 is higher than a maximum wear threshold and/or the at least one friction element is absent and/or the sealing of the hydraulic fluid 5 is not correct and/or the master cylinder assembly 7 is not correctly operative.

Merely by way of an example, in FIG. 1 there are shown, in a totally schematic manner, a luminous indicator 53, an audible indicator 54, and a communication device 56 in communication with a second communication device (not shown), none of which is strictly necessary.

The membrane detector device 40 may also comprise or be associated with a power supply source 57 which provides for power supplying the above components.

Also the output devices 52 or some of them may be part of the control device 2 as shown, or part of a different component of the hydraulic braking system 1, or part of a component of the speed gear shifting system, for example of the gearshift assembly associated with the hub of the rear wheel.

In that case, the output device 52 may use a luminous and/or audible indicator also intended for issuing signals relating to the gearshift or other bicycle equipment, for example with a suitable control by the micro-controller 51, and/or the power supply source 57 may be intended also for powering other components of the control device 1.

The communication device 56 may be for example a communication module, preferably a short range and low consumption one, for example according to the Bluetooth, Bluetooth Low Energy, or ANT+ protocol.

The luminous indicator 53 may comprise one or more LEDs or other luminous sources. A single luminous indicator may for example light up as soon as the level of brake fluid 5 in the tank 20 lowers below a predetermined threshold level. When there is a polychromatic LED or another polychromatic source, or there are plural LEDs or other sources of different color, or there is an LED array, it is possible to provide a multiple visual indication, for example by turning on an orange light or a flashing light when the level of brake fluid 5 lowers below a first threshold and a red light or a steady light when the level of fluid 5 lowers below a second threshold less than the first threshold; or to provide a visual indication of the amount of brake fluid 5 contained in the tank 20, by turning off the LEDs at the top or right end of the array of LEDs as the tank 20 empties.

The audible indicator 54 may be for example a small buzzer and may emit one or more sounds for providing a more or less accurate communication relative to the level of the brake fluid 5 in the tank 20.

The battery power supply source 57 may be dedicated to the membrane detector device 40 or may be intended also for powering other electric or electronic devices housed in the control device 2, possibly including the above-mentioned data processing system 51, memory means 50 and/or output devices 52. Alternatively, the battery power supply source 57 may advantageously be that of a cycle computer or of a smartphone, a tablet or other computer connected in a fixed or removable manner to the control device 2. Merely by way of an example, the communication may occur through a micro-USB connector.

In order to contain the energy consumption as much as possible, the membrane detector device 40 may be activated only periodically, under the control of said data processing system 51, for example at predetermined time intervals or implementing a braking counter, for example counting pulses generated by a micro-switch activated upon pressure of the manual actuation member 6, once a day or once a week or once a month, etc.

Alternatively or additionally, the membrane detector device 40 or in general the control device 2 may have a stand-by mode and the tank 20 or in general the control device 2 may be provided with a waking system, for example based on an accelerometer.

It may also be provided for the membrane detector device 40 to be selectively actuatable by the cyclist.

The control device 2 may also comprise, alternatively or additionally to the battery power supply source 57, an "energy harvesting" system, which exploits for example solar energy, kinetic energy or something else.

Figure 20:
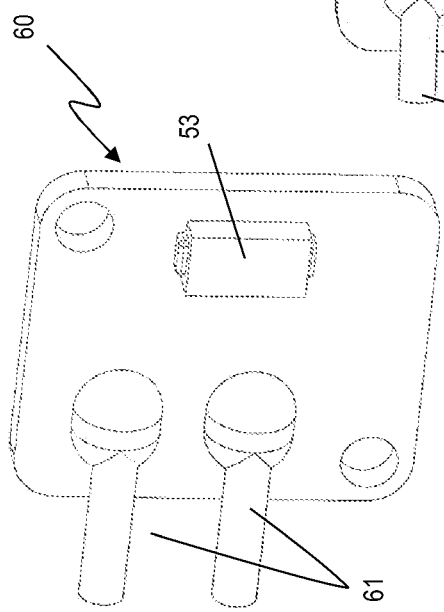
Figure 21:
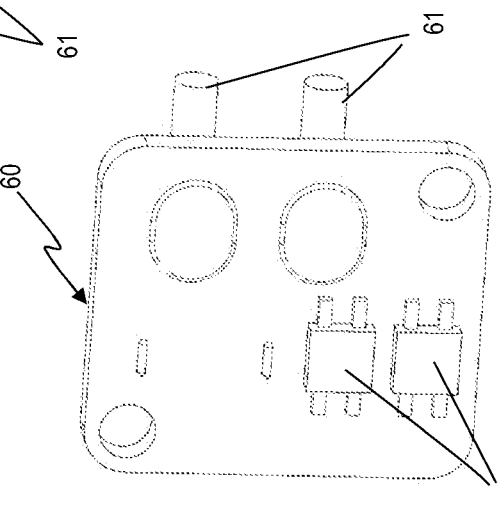

Advantageously, one or more of the sensors 41, 42 and one or more of the output devices 52 are housed on opposite faces of a single printed circuit board or PCB 60, as shown by way of an example in FIGS. 20-21. Powering connectors 61 leading to the power supply source 55 are also shown.

Figure 22:
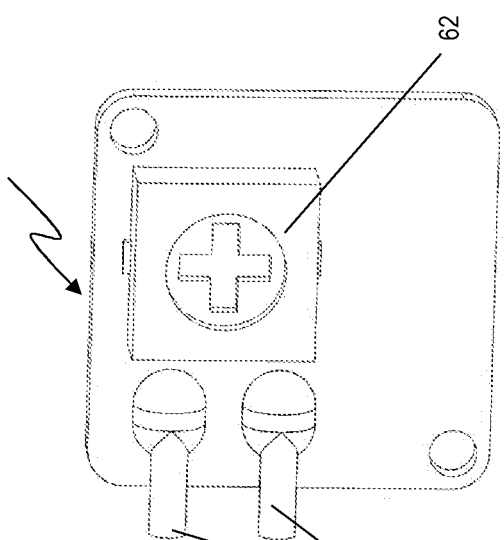

FIG. 22 shows, by way of an example, a PCB 60 carrying a precision screw support 62 for mounting a sensor of the membrane detector device 40 in order to accomplish the sensitivity adjustment.

FIGS. 23-27 show, by way of an example, a practical embodiment of the main components of a braking system 1 as described above. Analogous component are indicated with the same reference number.

Figure 23:
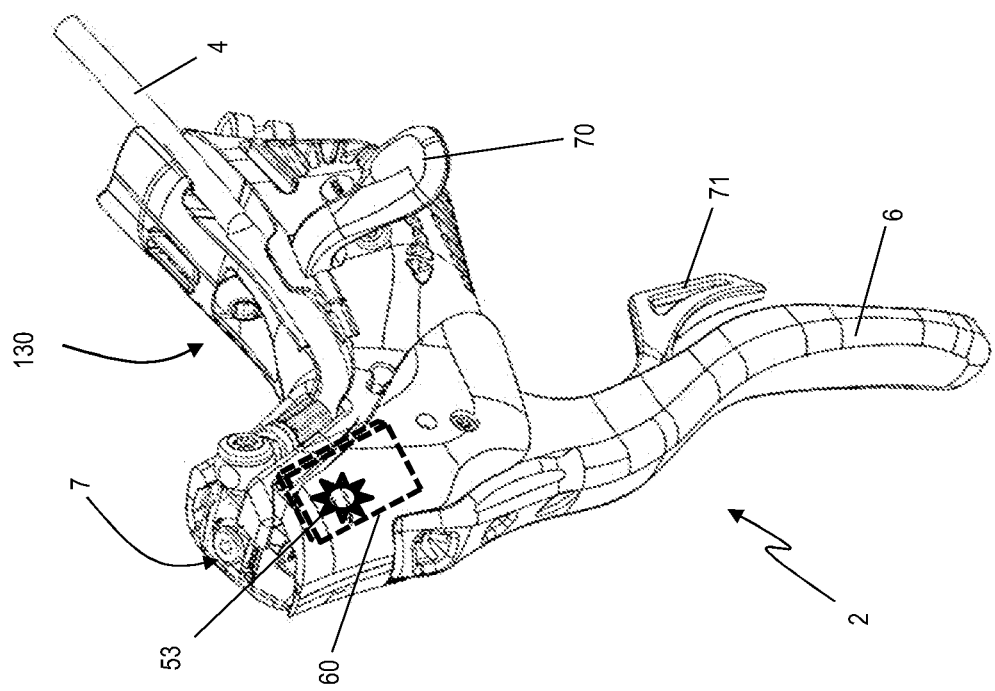
FIG. 23 shows a control device part of a bicycle hydraulic braking system, FIG. 24 schematically shows a section across the control device of FIG. 23.
Figure 24:
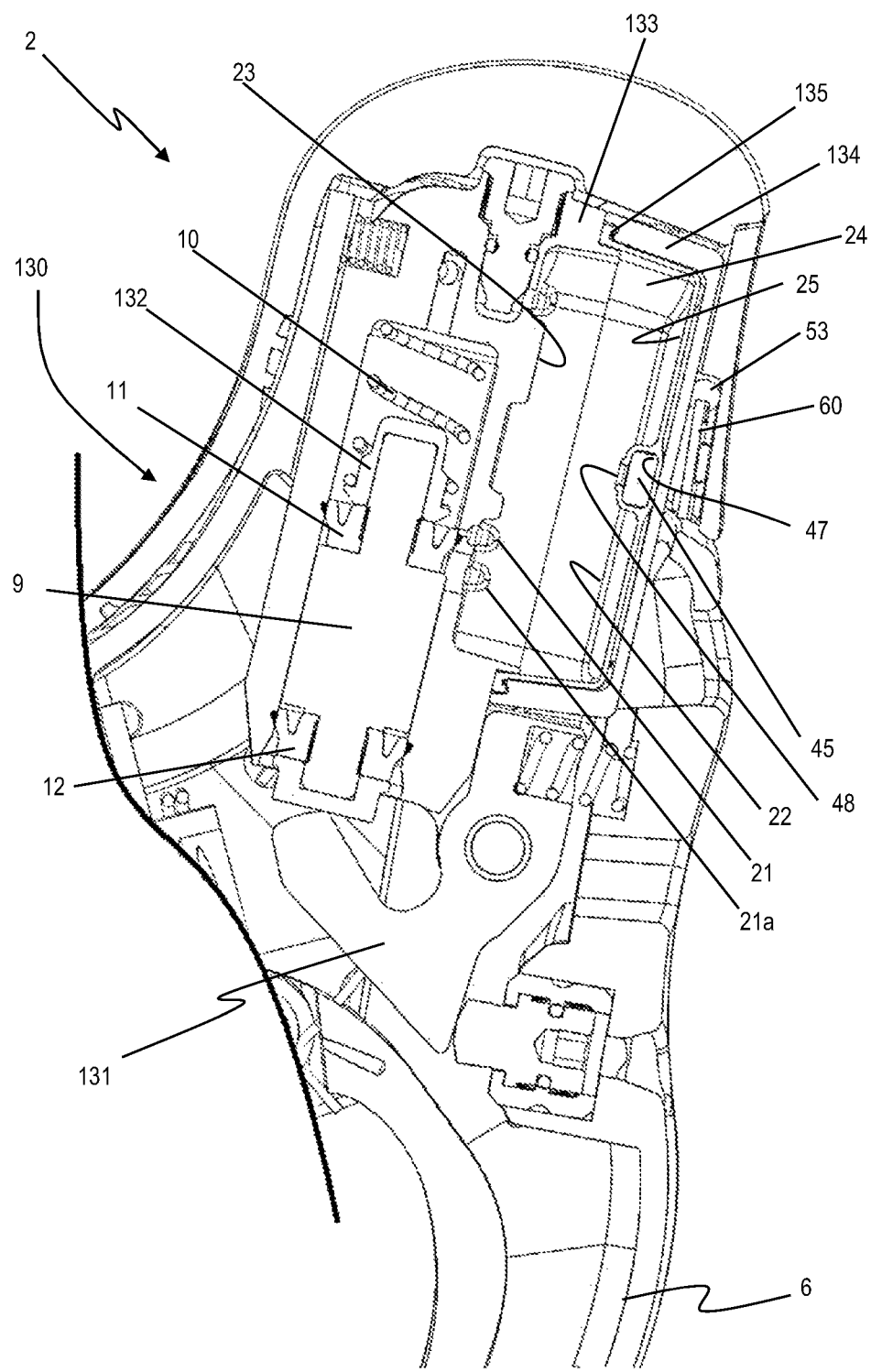

As far as the control device 2 is concerned, in FIGS. 23-24 a body 130 may be recognized, configured for fixing to the bicycle handlebar, possibly grippable, wherein the master cylinder assembly 7 is formed or fixed, and on which the manual actuation member 6 or brake lever is articulated. Also the above mentioned gearshift levers 70, 71 are visible, as an example of manual actuation members of a speed gear shifting system.

The PCB 60 is preferably fixed, as shown by way of an example in FIGS. 23-24, in a suitable position which is adjacent to the ceiling 22 or to the lateral wall 24 of the tank 20 and adjacent to the outer surface of the control device 2.

If the control device 2 is covered by a protection sheath (not shown), the latter may be provided with a suitable aperture at the or each output device 52, and with possible protection windows, for example a transparent window for protecting the one or more luminous indicators 53.

When a luminous indicator 53 or an audible indicator 54 is provided for, preferably the PCB 60 is adjacent to the outer surface of the control device 2 in a proximal position to the cyclist in the condition of use of the bicycle and in particular visible by the cyclist, for example on the proximal face of a control device for a curved handlebar, of the so-called "drop-bar" type, as shown.

Figure 25:
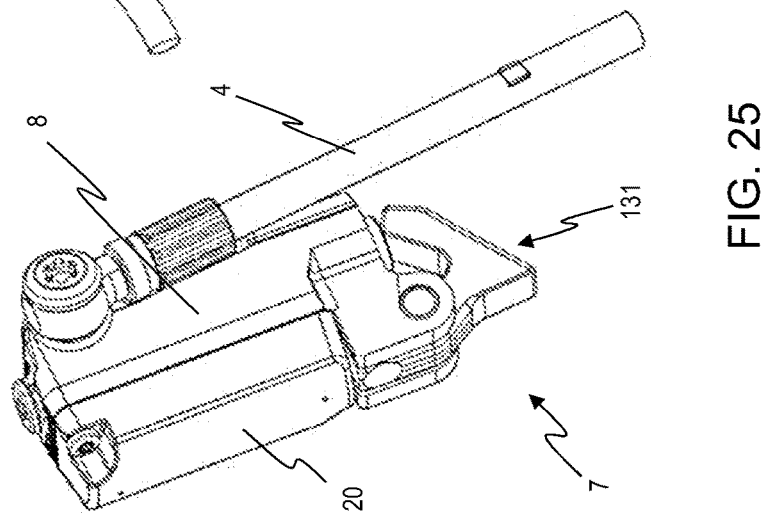
FIG. 25 shows a master cylinder assembly of a bicycle hydraulic system and a kinematic associated thereto.

A kinematics 131 may also be seen, interposed between the manual actuation member 6 or brake lever and the cylinder 8 of the master cylinder assembly 7, more evident in FIG. 25.

In the master cylinder assembly 7, the above discussed components may be seen, and additionally a cap 132 configured to hold the gasket 11 (if provided for) on the head 13 of the piston 9 and to support the return spring 10. The cap 132 is not strictly necessary.

Advantageously, the tank 20 is formed in part by a region 133 one piece with the body 130 and in part by a cover 134, although this is not strictly necessary. Advantageously, the peripheral region 135 of the membrane 25 is watertight-sealing clamped between the cover 134 and the region 133 one piece with the body 50 of the control device 2.

It may be seen, also with reference to FIGS. 18-19, that the example membrane 25 has a substantially tub-like shape, and has a central region 136 having a substantially flat zone 137 intended to conform with the ceiling 22 in the condition of filled tank 20 and respectively with the bottom 23 in the condition of empty tank 20, said peripheral region 135 intended to be fixed to the tank 20, and an annular region 138 interposed therebetween, which according to the amount of brake fluid 5 present is intended to conform with and adhere to a variable region of the lateral wall 24 of the tank 20. The peripheral region 135 and the substantially flat zone 137 of the central region 136 extend in planes that remain substantially parallel, while the annular region 138 extends substantially orthogonally to said planes, in a non-stressed condition of the membrane 25.

The region 133 one piece with the body 130 defines the bottom 23 of the tank 20 and, preferably, a first part of its lateral wall 24. The cover 134 defines the ceiling 22 of the tank 20 and, preferably, the remaining part of its lateral wall 24. The region 133 one piece with the body 130 and the cover 134 are thus both concave, and have the concavities facing towards each other.

Preferably, the region 133 one piece with the body 130 and the cover 134 have approximately the same depth—or height of the respective part of lateral wall 24 of the tank 20—so that the membrane 25 adopts a curvature substantially the mirror image in its two extreme positions at the ceiling 22 and at the bottom 23 of the tank 20.

For further details relating to the control device 2 and to the tank 20 reference is made to the above cited document EP3835191A1, as if it were directly incorporated herein.

It is noted that the tank 20 might also have a spheric or almost spheric shape, wherein the membrane 25 is peripherally fixed to a diametric plane of the sphere and adopts a convex configuration when the tank is filled and a concave configuration when the tank is empty, a lateral wall being absent or substantially absent.

Figure 27:
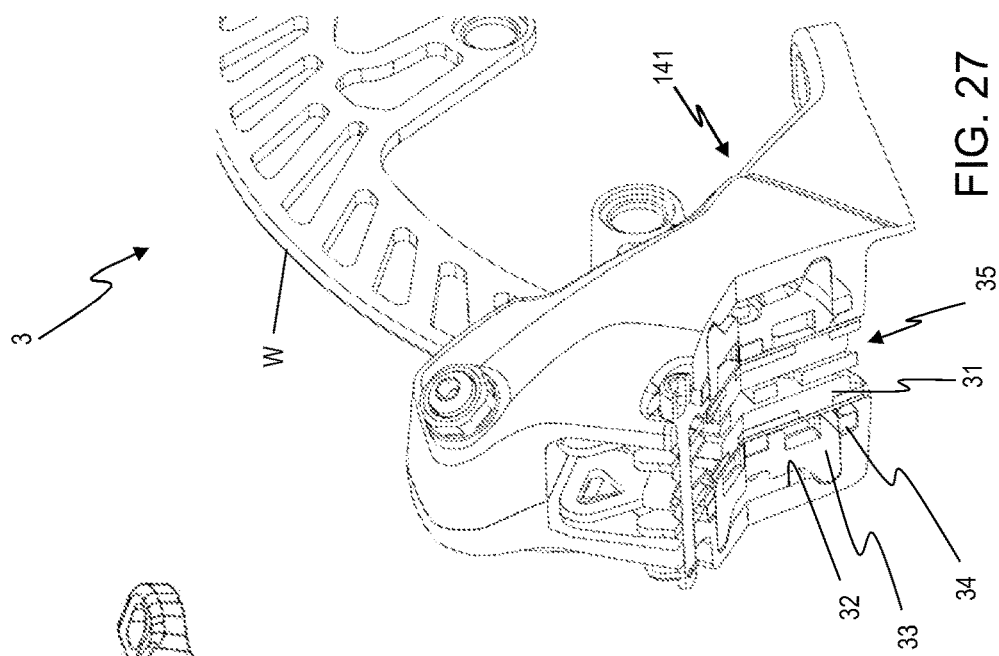
Figure 26:
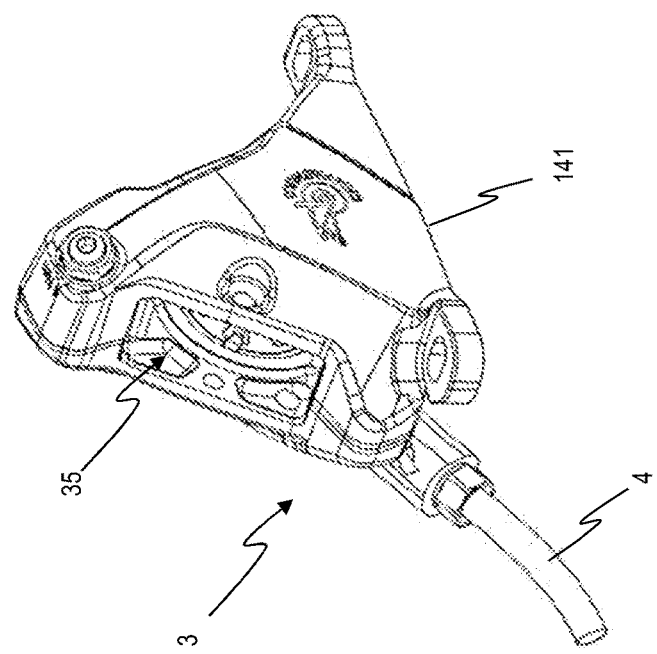

An example braking device 3 or brake caliper is represented in FIGS. 26-27. The brake caliper 3 is shown upside down for the sake of convenience; in FIG. 26 the pad 31 is omitted, visible instead in FIG. 27. The brake caliper 3 has a body 141 configured for fixing to the bicycle frame or on the fork in proximity to the hub of a wheel with which the disc W (FIG. 1) integrally rotates. In the body 141, the gap 35 in which the above-mentioned disc W is inserted, as well as (FIG. 27) one of the two pistons 33 of the slave cylinder assembly 30, housed in the respective cylinder 32, may be seen.

The various embodiments, variants and/or possibilities of each component or group of components that have been described are to be meant as combinable with each other in any manner, unless they are mutually incompatible.

The above is a description of various embodiments, variants and/or possibilities of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A method for diagnosing a bicycle hydraulic disc braking system, the method comprising the steps of:
   a) providing a master cylinder assembly comprising a cylinder, with a piston that reciprocates inside the cylinder against the action of a return spring, and a hydraulic tank having a bottom, a ceiling, and a membrane that divides the tank into a variable volume filled chamber and a complementarily variable volume empty chamber, said hydraulic tank being fluidically connected to the cylinder through at least one main passage in said bottom,
   b) providing a metering device for measuring a distance of the membrane from the ceiling of the hydraulic tank,
   c) inserting a hydraulic fluid in the master cylinder assembly,
   d) reciprocating the piston inside the cylinder,
   e) evaluating whether an output signal of the metering device is indicative of a temporary approach of the membrane to the ceiling having an extent corresponding to a predetermined approach range, and,
   f) establishing that the master cylinder assembly is correctly operating when the output signal is indicative of a temporary approach of the membrane to the ceiling.

2. The method according to claim 1, wherein the master cylinder assembly is fluidically connected in the hydraulic braking system during the execution of steps d), e), f).

3. A diagnostic system for a bicycle hydraulic disc braking system, the diagnostic system comprising:
   a master cylinder assembly having a cylinder, a piston that reciprocates inside the cylinder against the action of a return spring and a hydraulic tank comprising a bottom, a ceiling, and a membrane that divides the hydraulic tank into a variable volume filled chamber and a complementarily variable volume empty chamber, said hydraulic tank being fluidically connected to the cylinder through at least one main passage in said bottom,
   a hydraulic fluid filling at least in part the master cylinder assembly,
   a metering device for outputting a signal based on a measurement of a distance between the membrane and the ceiling of the tank,
   a data processing system configured to establish that the master cylinder assembly is correctly operating when the output signal is indicative of a temporary approach of the membrane to the ceiling having an extent corresponding to a predetermined approach range.

4. The system according to claim 3, wherein the temporary approach starts and ends at the crossing of the main passage by a head of the piston in the cylinder of the master cylinder assembly.

5. The system according to claim 3, wherein the metering device comprises a sensor arranged at the ceiling of the tank and a detectable member borne by the membrane.

6. The system according to claim 5, wherein the sensor is an optical sensor, comprising a light source and a photodiode or phototransistor located to receive the light emitted by the light source and reflected by the membrane or by said detectable member borne by the membrane when said membrane or said detectable member is in the field of view of the optical sensor.

7. The system according to claim 6, wherein the detectable member borne by the membrane is an insert that is more reflective than the membrane.

8. The system according to claim 6, wherein the light source is an LED.

9. The system according to claim 5, wherein in the membrane a pocket is formed, configured to house the detectable member borne by the membrane.

10. The system according to claim 3, wherein the metering device is configured to be actuatable and is:
    selectively actuatable by a user and/or
    periodically actuated under the control of a controller.

11. The system according to claim 10, wherein the metering device has a stand-by mode and a control device is provided with a waking system.

12. The system according to claim 11, wherein-said at least one output device is selected from the group consisting of:
    at least one audible indicator,
    at least one luminous indicator, and
    a communication device.

13. The system according to claim 12, wherein at least one sensor and said at least one luminous indicator are housed on opposite faces of one and a same printed circuit board.

14. The system according to claim 3, comprising at least one output device outputting the outcome of said evaluation.

15. The system according to claim 3, wherein the piston of the master cylinder assembly has a head and a thrust end and a gasket is positioned at the head.

16. A manual control device for a bicycle hydraulic disc braking system, the control device comprising a manual actuation member configured to issue a braking command and the diagnostic system according to claim 3, wherein the piston is displaced inside the cylinder in a forward stroke in response to the actuation of the manual actuation member.

17. A bicycle hydraulic disc braking system, comprising:
    the master cylinder assembly and the metering device of the diagnostic system according to claim 3, wherein the piston is displaced inside the cylinder in a forward stroke in response to the actuation of the manual actuation member,
    at least one control device, the at least one control device comprising a manual actuation member, the manual actuation member configured to issue a braking command, and
    a respective hydraulic braking device fluidically connected to the master cylinder assembly,
    wherein said diagnostic system is part of a component of the hydraulic disc braking system.

18. The bicycle hydraulic disc braking system according to claim 17, wherein the data processing system is part of the control device.

19. A bicycle comprising:
a hydraulic disc braking system comprising:
the diagnostic system according to claim 3, wherein the piston is displaced inside the cylinder in a forward stroke in response to the actuation of the manual actuator,
at least one control device, the at least one control device comprising a manual actuation member, the manual actuation member configured to issue a braking command,
a respective hydraulic braking device fluidically connected to the master cylinder assembly, and
a speed gear shifting system,
said at least one control device comprising at least a second manual actuator configured to issue a speed gear shifting command to the speed gear shifting system, and
wherein the data processing system is part of a component of the speed gear shifting system.

20. The bicycle according to claim 19, wherein the data processing system is part of a gearshift assembly of the speed gear shifting system associated with a hub of a bicycle rear wheel.

\* \* \* \* \*